(12) United States Patent
Kronholz et al.

(10) Patent No.: US 12,319,514 B2
(45) Date of Patent: Jun. 3, 2025

(54) CONVEYOR DEVICE (71) Applicant: Interroll Holding AG, Sant' Antonino (CH)

(72) Inventors: Stephan Kronholz, Hückelhoven (DE);
Kai Lubomierski, Hückelhoven (DE);
Jürgen Zinn, Hückelhoven (DE);
Erwin Mans, Hückelhoven (DE)

(73) Assignee: Interroll Holding AG, Sant' Antonino (CH)

( * ) Notice: Subject to any disclaimer, the term of this patent is extended or adjusted under 35 U.S.C. 154(b) by 107 days.

(21) Appl. No.: 18/286,765

(22) PCT Filed: Apr. 8, 2022

(86) PCT No.: PCT/EP2022/059446
§ 371 (c)(1),
(2) Date: Oct. 13, 2023

(87) PCT Pub. No.: WO2022/218859
PCT Pub. Date: Oct. 20, 2022

(65) Prior Publication Data
US 2024/0182251 A1 Jun. 6, 2024

(30) Foreign Application Priority Data

Apr. 16, 2021 (DE) .................. 102021109698.7

(51) Int. Cl.
*B65G 45/22* (2006.01)
*A22C 17/08* (2006.01)
(Continued)

(52) U.S. Cl.
CPC ............. *B65G 47/57* (2013.01); *B65G 45/22* (2013.01); *B65G 47/841* (2013.01)

(58) Field of Classification Search
CPC ...... B65G 45/22; B65G 47/57; B65G 47/841; A22C 17/08
(Continued)

(56) References Cited

U.S. PATENT DOCUMENTS 4,616,381 A 10/1986 Harris, Jr.
5,088,959 A * 2/1992 Heemskerk .......... A01K 45/005
452/183
(Continued)

FOREIGN PATENT DOCUMENTS

AU 2012201887 B2 10/2012
CN 110731366 A 1/2020
(Continued)

*Primary Examiner* — Douglas A Hess
(74) *Attorney, Agent, or Firm* — Michael Soderman (57) ABSTRACT

Conveyor device (1), adapted to
takeover of a conveyed object (F2), in particular a piece of meat, in a takeover area (A1) from an upstream feed in device (110),
transfer of the conveyed object (F2) in a handover area (A3), in particular to a downstream disposal device (120),
handover the object (F2) in a handover area (A2) from the takeover area (A1) in the handover area (A3),
the conveyor device comprises
a plurality of discrete transport units (21), in particular transport baskets (21), the transport units (21) being arranged in particular in a circulating manner,
the transport units are adapted to
to receive the object (F2) to be conveyed in the takeover area (A1),
to be transferred between the takeover area (A1) and the handover area (A3),
and to handover the object (F2) to be conveyed in the handover area (A3),
(Continued)

wherein the conveyor device comprises a spraying arrangement (40), wherein the spraying arrangement (40) being adapted to provide at least one spraying functionality by means of which the transport units are sprayed with a liquid.

8 Claims, 3 Drawing Sheets

(51) Int. Cl.
*B65G 47/57* (2006.01)
*B65G 47/84* (2006.01)

(58) Field of Classification Search
USPC .......................................................... 198/493
See application file for complete search history.

(56) References Cited

U.S. PATENT DOCUMENTS

| | | |
|---|---|---|
| 7,794,311 B2 | 9/2010 | Groenewegen et al. |
| 10,308,445 B2 * | 6/2019 | Shinzaki ................. F16C 13/02 |
| 10,703,588 B1 * | 7/2020 | Schram ................ B65G 65/425 |
| 11,178,854 B2 * | 11/2021 | Baguley ................. B65G 45/22 |
| 2010/0221991 A1 | 9/2010 | Hagendoorn et al. |
| 2020/0221671 A1 | 7/2020 | Baguley |

FOREIGN PATENT DOCUMENTS

| | | | |
|---|---|---|---|
| DE | 102020134233 A1 | 6/2022 | |
| GB | 1307031 A | 2/1973 | |
| WO | 2016087866 A1 | 6/2016 | |
| WO | 2017201303 A1 | 11/2017 | |
| WO | 2020108831 A1 | 6/2020 | |
| WO | WO-2024147925 A1 * | 7/2024 | ............... A23B 4/24 |

\* cited by examiner

| | U1 | U2 | U3 | U4 | U5 | U6 |
|---|---|---|---|---|---|---|
| #1 | x | | | | | |
| #2 | | x | | | | |
| #3 | | | x | | | |
| #4 | | | | x | | |
| #5 | | | | | x | |

41P dt = 1,2 x tU
dT = 6 x tU b)

| | U1 | U2 | U3 | U3 | U5 | U6 | U7 | U8 | U9 | U10 | U11 |
|---|---|---|---|---|---|---|---|---|---|---|---|
| #1 | x | | | | | | | | | | |
| #2 | | | x | | | | | | | | |
| #3 | | | | | x | | | | | | |
| #4 | | | | | | | x | | | | |
| #5 | | | | | | | | | x | | |

41P dt = 2,2 x tU
dT = 11 x tU c)

| | U1 | U2 | U3 | U4 |
|---|---|---|---|---|
| #1 | x | | | |
| #2 | | | | x |
| #3 | | | x | |
| #4 | | x | | |
| #5 | x | | | |

CONVEYOR DEVICE

CROSS REFERENCE TO RELATED APPLICATIONS

This application is the U.S. national stage of International Application No. PCT/EP2022/059446, filed on 2022 Apr. 8. The international application claims the priority of DE 102021109698.7 filed on 2021 Apr. 16; all applications are incorporated by reference herein in their entirety.

BACKGROUND

The invention relates to a conveyor device.

Hygiene plays a very important role, especially in the food industry. It is unavoidable that food comes into contact with microbiological germs. However, the extent of contamination has a significant effect on the shelf life of the food. In particular, cross-contamination must be reduced, i.e. the transfer of contamination from one piece of food to another piece of food via the processing equipment.

Up to now, the equipment involved in food processing has been cleaned continuously. This is done at fixed intervals, which are determined depending on the respective contamination or contamination with biological germs. In other words, when the contamination load is higher, cleaning is carried out more frequently than when the contamination load is lower. For a deep cleaning of the plants, parts of the production have to be shut down.

In the meat processing industry in particular, meat is often cut in order to separate individual meat parts from a carcass. In the context of the present description, meat is also expressly understood to include fish meat and poultry meat.

German patent application 10 2020 134 233.0 describes a conveyor device that is intended for transferring pieces of meat between two conveyor devices. By means of separate transport units the meat pieces are conveyed separately.

WO 2017/201 303 A1 discloses a device for vacuum freezing of poultry. In this process, the poultry parts are conveyed several times in common water baths in order to remove heat from the poultry. To keep the poultry parts moist, they are sprayed with water from such a water bath. Germs from one poultry part can easily migrate to another poultry part and thus promote cross-contamination.

AU 2012201887 B1 discloses a device for collecting and transporting away innards in transport trays. After transport, the transport trays are cleaned.

WO 2020/108831 A1 discloses a device for turning over conveyed food. For improved detachment of the food from a conveying surface during this turning process, the conveying surface is sprayed with liquid.

WO 2016/087866 A1 discloses a method for reducing germs on a poultry carcass.

US 2010/0221991 A1 discloses an apparatus for skinning poultry parts. Herein, individual poultry parts are received in separate transport units and conveyed above a skinning device.

U.S. Pat. No. 4,616,381 A discloses a method for removing and transporting eggs in a cup. The cup is cleaned with hot water after transport.

SUMMARY

Conveyor device (1), adapted to takeover of a conveyed object (F2), in particular a piece of meat, in a takeover area (A1) from an upstream feed in device (110), transfer of the conveyed object (F2) in a handover area (A3), in particular to a downstream disposal device (120), handover the object (F2) in a handover area (A2) from the takeover area (A1) in the handover area (A3), the conveyor device comprises a plurality of discrete transport units (21), in particular transport baskets (21), the transport units (21) being arranged in particular in a circulating manner, the transport units are adapted to to receive the object (F2) to be conveyed in the takeover area (A1), to be transferred between the takeover area (A1) and the handover area (A3), and to handover the object (F2) to be conveyed in the handover area (A3), wherein the conveyor device comprises a spraying arrangement (40), wherein the spraying arrangement (40) being adapted to provide at least one spraying functionality by means of which the transport units are sprayed with a liquid.

DETAILED DESCRIPTION

It is the object of the present invention to provide an improved conveyor device which meets, in particular, the hygienic requirements in the food processing industry.

The object underlying the invention is solved by a device and a use according to the main claims; embodiments are subject of the subclaims and the description.

The device is characterized by a spraying arrangement by which the hygiene of the device is increased. In particular, the spraying arrangement can be used for cleaning and/or for supplying a disinfecting liquid.

In one embodiment, a first spray functionality is provided. The first spray functionality can be used to specifically wetting the transport units. The wetting is not so much for mechanical removal as for preventing adhesion of germs to the transport unit.

Already with the reduction of adhesions of germs on the transport units, the extent of cross-contamination can be reduced. A reduction in germs can fundamentally increase the shelf life of food parts.

The first spray functionality is used during a transport operating condition in which the conveyor device is used to convey objects.

In the first spray function, the amount of liquid used is optimized. In particular, individual sprays are timed using a first spraying nozzle so that the transport units are hit precisely.

Spraying position on spiral; due to a spiral movement, the baskets can be wetted well. The spiral movement produces relative transverse movement to the spraying nozzle and thus improved wetting variety.

In particular, so little first spray liquid is used that the first spray liquid comes to rest almost completely on the transport unit and any residual components are absorbed by the ambient air. In this way, it is possible to avoid the formation of droplets which are deposited in the environment.

The first spray liquid is used primarily to wet the transport units. This reduces the adhesion of meat parts to the transport unit. This in turn ensures that less contamination is deposited on the transport unit.

It is preferred if the transport units are not sprayed in every cycle in order to keep the liquid consumption low or to manage without waste water collection and/or waste water disposal.

In one embodiment, a second spray functionality is provided. The second spray functionality can be used to specifically remove impurities from the transport units, in particular by mechanical removal and/or by dissolving using chemical cleaning agents. Raw meat in particular tends to adhere to surfaces, which can be significantly reduced by liquid wetting. The reduced adhesion of the meat as a whole also reduces the adhesion of germs.

The second spray functionality is used during a cleaning operation condition in which the conveyor device is not conveying an object.

A second spray power of the second spray functionality is in particular greater than a first spray power of the first spray functionality. The spray output can be measured on the basis of the kinetic energy of the sprayed-out spray liquid per unit of time sprayed or on the basis of the output of corresponding liquid pumps that pressurize the respective spray liquid.

The circulation time is in particular the time required by a transport unit to move from the takeover area via the handover area back to the takeover area. The total spraying interval is in particular the time span between two spraying impacts on the same transport unit. The single spray interval is the time span between two spray impacts (on any transport unit).

The conveyor device is characterized in particular by a plurality of discrete transport units which can receive the object parts for conveying. The transport units can be comparatively small in themselves and therefore provide only a small collection surface for contaminating, undesirable cutting by-products. Undesirable slipping along surfaces is prevented. In particular, the use of walls with recesses reduces the contact surfaces.

The transport units are, in particular, separate transport baskets.

The transport units are particularly adapted to receive object parts having a mass of at least 100 g, 200 g, 300 g, 400 g, 500 g, 600 g, 700 g, 800 g, 900 g or 1000 g and a maximum of 200 g, 300 g, 400 g, 500 g, 600 g, 700 g, 800 g, 900 g, 1000 g, 1200 g, 1400 g or 1600 g of food. The transport units define a transport space suitable for holding disassembled food products having a volume of at least 1000 $cm^3$, 1500 $cm^3$, 2000 $cm^3$, 2500 $cm^3$, 3000 $cm^3$, 3500 $cm^3$, 4000 $cm^3$, 4500 $cm^3$ or 5000 $cm^3$ and/or a maximum of 1000 $cm^3$, 1500 $cm^3$, 2000 $cm^3$, 2500 $cm^3$, 3000 $cm^3$, 3500 $cm^3$, 4000 $cm^3$, 4500 $cm^3$ or 5000 $cm^3$. In particular, the transport units have a width and/or length and/or height of at least 5 cm, 10 cm, 15 cm, 20 cm, 25 cm, 30 cm, 40 cm or 50 cm and/or a maximum width and/or length and/or height of at least 10 cm, 15 cm, 20 cm, 25 cm, 30 cm, 40 cm or 50 cm.

In particular, the conveyor device according to the invention is arranged for collecting meat parts delivered by a cutting device, in particular a meat cutting machine.

The transport units can be transferred, in particular pivoted, between a takeover position and the handover position. In the takeover position, an object is held securely in the transport unit. In the handover position, a conveyed object can independently and gravitationally move out of the transport unit, in particular slide or fall.

In particular, the conveyor device has a control arrangement that is set up to transfer the transport unit, in particular as a function of its position, between a pick-up position and the transfer position. In this case, the transport unit can be transferred to the handover position when the transport unit reaches the handover area, and/or the transport units can be transferred to the takeover position at the latest before reaching the takeover area.

In one embodiment, the conveyor device comprises a support rail that is arranged to support the transport unit between the takeover area and the handover area. The support rail can have a three-dimensionally curved course and/or the support rail can have at least one ascending section and one descending section.

In one embodiment, the spraying arrangement is arranged such that the transport units perform both a lateral movement and a twisting movement while the transport units are sprayed with liquid as part of the first and/or second spraying functionality.

In one embodiment the spraying arrangement comprises
a collecting device arranged for collecting returning spray liquid, and/or
a treatment device for cleaning collected spray liquid, and/or
a recirculation device for recirculating collected and/or purified spray liquid for use by the first and/or second spray functionality.

In one embodiment, the spraying arrangement is adapted that the transport units are sprayed in a return area, in particular for carrying out the first spraying functionality, the return area being arranged downstream of the handover area and upstream of the takeover area, as viewed in the conveying direction. The spraying of the transport units thus takes place in particular in an empty state of the transport units.

The conveyor device is in particular a food conveyor device, in particular a meat conveyor device. In particular, the object to be conveyed is a food part, in particular a meat part, in particular a poultry part.

The transport unit can be attached to a transport carriage that can be moved along a support rail.

The support rail, the base carrier, the rail holder and/or the transport units and possibly other components of the device have, in particular, a stainless steel surface.

BRIEF DESCRIPTION OF THE DRAWINGS

The invention is explained in more detail below with reference to the figures; herein shows.

DETAILED DESCRIPTION OF THE PREFERRED EMBODIMENTS

Figure 1:
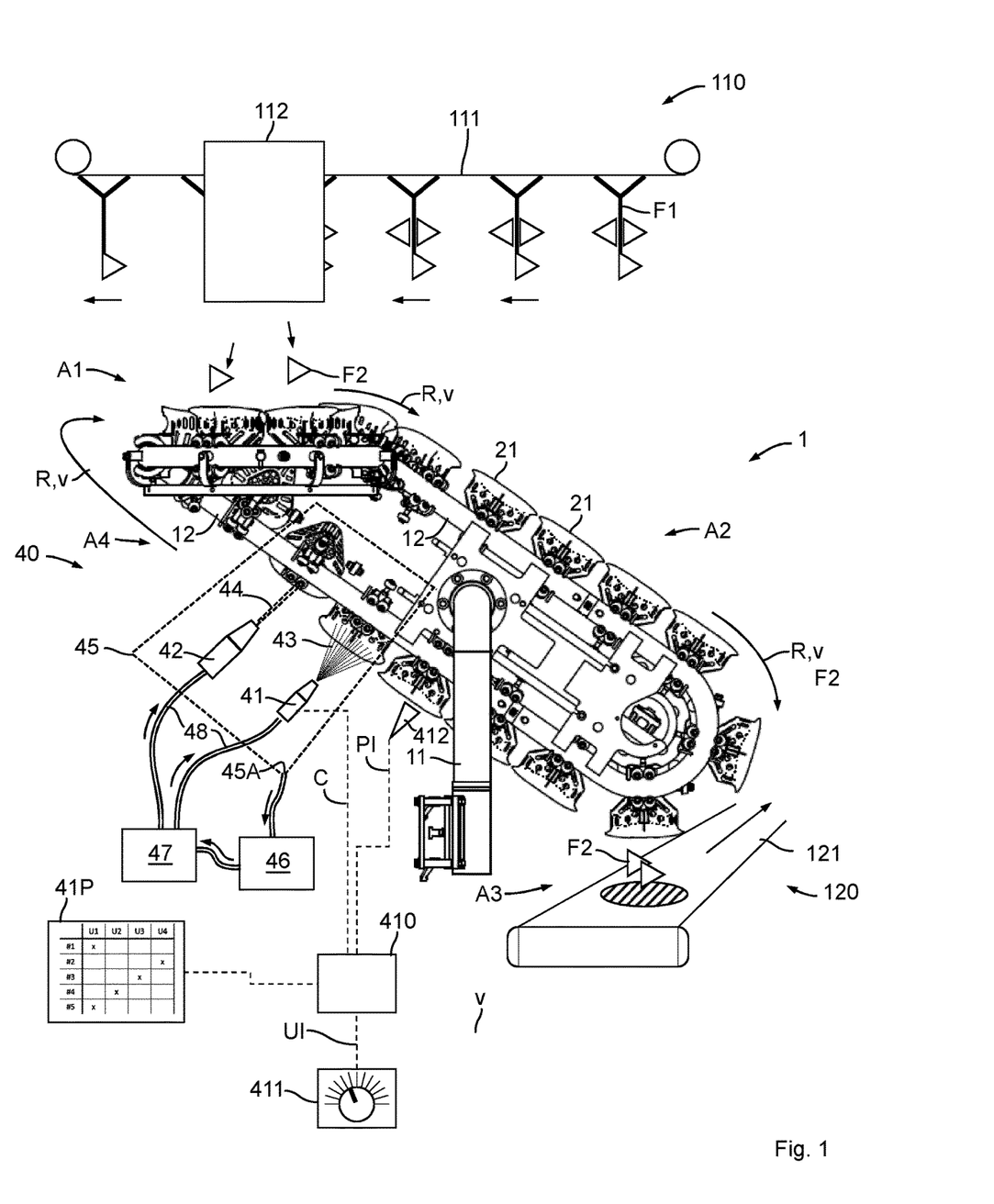
FIG. 1 schematically shows the structure of a conveyor arrangement with a conveyor device according to the invention.

FIG. 1 shows a conveyor arrangement 100. The conveyor arrangement 100 comprises a feed in device 110 by which object parts F2 are provided. These object parts F2 are in particular poultry meat parts, such as chicken wings, chicken breasts or chicken thighs.

The feed in device 110 comprises a feed in conveyor 111, which can be designed as an overhead conveyor. Larger object units F1 are conveyed to this feed in conveyor. These object units F1 are in particular a poultry carcass.

The feed in device 110 comprises a disposal unit 112, which provides object parts F2 of the object unit F1. In particular, the disposal unit comprises a separating device which separates the object parts F2 from the object unit F1.

The object parts are finally transported away by a disposal device 120. The disposal device 120 can have a disposal conveyor 121, in particular a conveyor belt.

A conveyor device 1 according to the invention is provided for transferring the object parts F2 from the feed in device 110 to the disposal device 120. The conveyor device 1 is set up to take over the object parts F2 from the feed in conveyor 111 at a takeover area A1 and to transfer them to the disposal device 120 at a handover area A3.

FIG. 1 shows in a reduced representation a function of the conveyor device 1 within the conveyor arrangement 100. The provision of the object parts F2 at the takeover area A1 and the delivery of the object parts F2 at the handover area A3 is shown schematically.

Consequently, the conveyor device 1 fulfills a spatially funneling function in order to position the object parts F2 arriving at the takeover area A1 in a spatially widely scattered manner in a defined manner in a comparatively small handover area A3.

In conventional conveyor arrangements, this funneling function is performed by a suitably shaped stainless steel plate between the takeover area A1 and the handover area A3. The object parts F2 slide along the stainless steel plate. Each object part leaves behind individual contaminations. After about one hour of operation, there are individual contaminations on the stainless steel sheet, for example from several thousand object units F1. Further object parts sliding along now come into contact with this contamination.

The present invention now provides means of ensuring that the individual object parts are significantly less contaminated with germs from other object parts. For this purpose, a conveyor device according to the invention is used instead of the stainless steel sheet, which is explained in more detail below.

The conveyor device 1 according to the invention (see FIG. 1) comprises a plurality of transport units 21. Such a transport unit 21 can be designed, for example, as a transport basket. Other forms are also possible, although it must be ensured that the transport unit 21 can safely pick up the object parts F2 and selectively deliver them again.

The transport units 21 are arranged to be transferable along a conveying direction R between the takeover area A1 and the handover area A3. At the takeover area A1, a transport unit 21 takes over one or more object parts F2 and transports them to the handover area A3, where the transported object parts F2 are transferred to the disposal device 120. The conveying direction R is circulating, so that the transport units return to a starting position after one circulation.

The transport unit (FIG. 2) comprises side walls 21s and a base 21b. The side walls 21s and the base 21b form a receiving space for receiving the object parts. The object parts can enter or leave the receiving space through a receiving opening 210.

Figure 2:
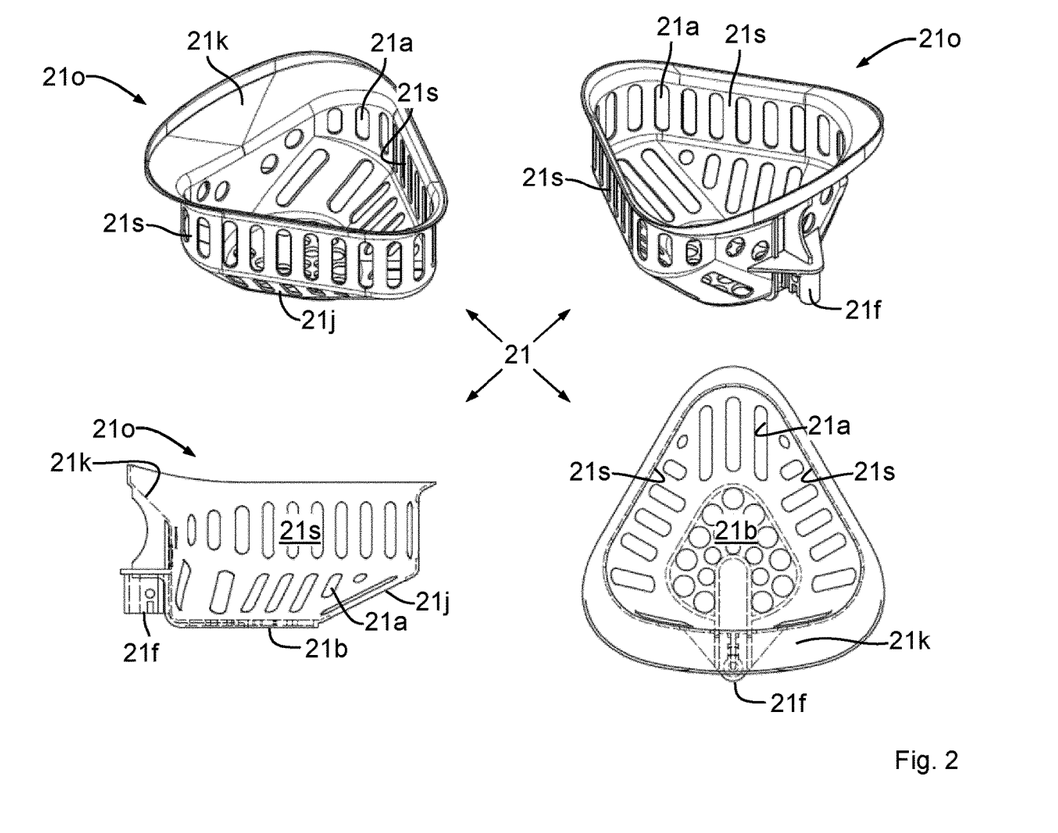
FIG. 2 transport units of the conveyor device according to FIG. 1 in several representations.

The walls have a plurality of recesses 21a. The recesses 21a are arranged on the bottom walls 21b and the side walls 21s in such a way that the object parts are held reliably in the receiving space, but on the other hand the contact area between the object parts and the transport unit is as small as possible. The transmission paths of contamination are thus reduced to a minimum. The walls (base and side walls) form a downwardly pronounced taper 21j. This reduces the downward outer circumference of the transport unit.

Above the first fixing section 21f, the side wall 21s has a collar 21k that covers the first fixing section 21f when viewed from above. The collar 21k is inclined downward in the direction of the receiving space. Falling object parts F2 are thus kept away from the first fixing section 21f and guided into the receiving space as objects F2.

The conveyor device 1 comprises a base carrier 11. A support rail 12 is attached to the base carrier 11. The support rail 12 defines the conveying direction R. The transport units 21 are movably arranged on the support rail 12. The support rail 12 can be composed of several individual support rail segments.

The conveyor device includes a spraying arrangement 40. The spraying arrangement 40 includes two spraying nozzles 41, 42.

A first spraying nozzle 41 is arranged to generate a first spraying jet 43. The first spraying jet is in particular a spray mist 43. The first spraying jet 43 serves to wet the transport units with a first liquid. The wetting of the transport units causes fewer germs to adhere to the transport unit. As a result, fewer contaminants remain on the transport unit, which is a component for improving hygiene.

The first liquid of the first disposals praying jet 43 comprises in particular water, in particular at least 80% by volume. A thin film of water on the surface can prevent the above-mentioned effect of reduced adhesion of germs.

The first liquid of the first spraying jet 43 comprises, in particular in addition to water, a further component. The further component has, in particular, a disinfecting effect. The further component may comprise an alcohol. The proportion of the further component in the first liquid is in particular at most 20% by volume. In particular, the proportion of alcohol in the first liquid comprises max. 20 vol-%.

The wetting by means of the first spraying jet 43 takes place during a transport operating state. In the transport operating state, the objects F2 are transported. In this case, the transport unit is sprayed in a defined manner with the first spraying jet 43 so that the surface is at least partially wetted with liquid. Spraying takes place when there is no object F2 to be conveyed on the transport unit. Therefore, the first spraying nozzle 41 is arranged at a return area A4 of the conveyor device, i.e. in the conveying direction R between the handover area A3 and the takeover area A1.

In the return area, the transport units perform not only a lateral movement but also a pivoting movement and thus a rotary movement. This changes the relative orientation not only in one dimension but also in a second dimension, which is conducive to complete wetting of the transport unit. In this way, the probability of complete wetting can be increased while using as little liquid as possible.

The first spraying jet 43 can be executed so briefly and precisely that no substantial quantities of liquid drip down either. The liquid delivered by a spraying jet will be completely deposited on the transport unit. Alternatively, any remaining free liquid is absorbed by the ambient air, in particular as water vapor, so that no precipitation is formed which creates puddles on the floor.

Figure 3:
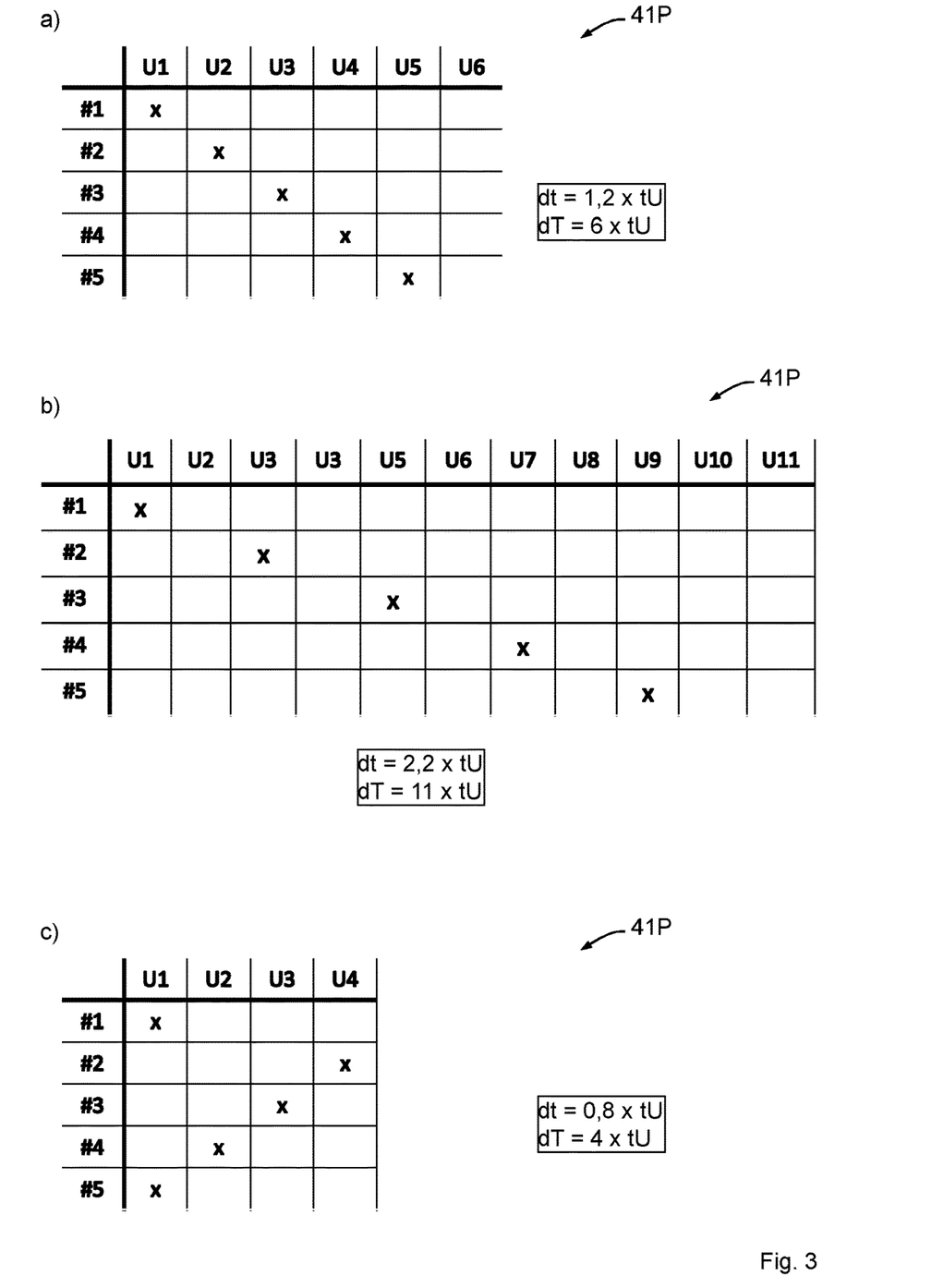
FIG. 3 different spraying schedules in tabular form.

In order to achieve the absorption of the first liquid without precipitation outside the transport units, the spraying of the transport units with the first spraying jet is carried out on the basis of a predefined spraying plan 41P, which is shown in tabular form as an example in FIG. 3.

For the sake of simplicity, it is assumed by way of example that the conveyor device 1 comprises five transport units 14, each numbered #1, #2, ... #5. The transport units are arranged on the conveyor device in a rotating manner. Each transport unit returns to its starting position after one revolution U1, U2 ... U6.

In one embodiment (FIG. 3a), the first transport unit #1 is sprayed in a first circulation U1. In a second circulation, the second transport unit #2 is sprayed, and so on. After the last transport unit #5 has been sprayed in the fifth circulation, a circulation U6 is made without spraying. The individual spraying interval dt between two spraying strokes (spray-free interval) is, for example, 1.2 times the circulation time tU. The total spray interval dT is six times the circulation time tU. The total spray interval dT is the duration between two spray bursts on an individual transport unit.

In one embodiment (FIG. 3b), the single spray interval is increased compared to the example shown in FIG. 3a. In this case, one spray burst is followed by a further cycle U2, U4, . . . without a burst. A total spray interval dT is 11 times the circulation time tU. A single spray interval dt is 2.2 times the circulation time tU.

In one embodiment, the individual spray interval is reduced compared to the example shown in FIG. 3a (FIG. 3c). A total spray interval dT is 4 times the circulation time tU. A single spray interval dt is 0.8 times the circulation time tU.

Even if in the previous examples the individual spray intervals are always of equal length, this is not a mandatory property; because in particular with a crooked number of transport units and with a short total spray interval, this is not always mathematically feasible. In this respect, the individual spray intervals can vary within an overall spray interval, whereby it is preferred that the individual spray intervals are distributed as evenly as possible and are thus as long as possible. The longest possible individual spray intervals dt promote complete absorption of the moisture in the form of water vapor by the ambient air.

The spraying pulses must also be timed so precisely that the transport unit 21 to be sprayed is in a defined alignment with the first spraying nozzle 41 at the time of the spraying pulse. This requires position information PI. To determine the position information PI, a presence sensor 412 is provided, which is set up to detect the presence of a transport unit 21 at a specific time. In combination with the known conveying speed v of the transport units 21 along the support rail 12, the position of the transport unit 21 relative to the first spraying nozzle 41 can be inferred. As soon as the transport unit 21 to be sprayed is then located at the first spraying unit, the spraying impact can be initiated on the basis of a control command C.

A control unit 410 is provided for the precise timing of the spray burst. Position information PI, for example from the presence sensor 412, serves as input values. Furthermore, the transport speed v is an input variable that can be used to determine the circulation time tU. The transport speed v can be provided electronically by a drive control of the conveyor device. Alternatively, the presence sensor can be positioned such that the spray burst is triggered immediately upon detection of the presence of a transport unit 21; in this case, knowledge of the velocity v is dispensable.

An input unit 411, exemplarily shown here as a potentiometer, is used to detect a user input U1.

The user default U1 can, for example, be the maximum value of a permissible total spraying interval dT. In other words, the total spraying interval dT is the specification at which interval at the latest an individual transport unit is to be sprayed. Based on the user specification U1 and the conveying speed v and the number of transport units, the control unit can generate a spraying schedule 41P as shown above. Based on the generated spray schedule 41P and the position information PI, individual spray strokes are then initiated in a targeted manner by control command.

Different food parts require different hygienic treatment. Thus, there are also different requirements within a particular product group. For example, chicken breast is a comparatively highly contaminated piece of meat, while beef has a comparatively low level of contamination. Using the input unit 411, the spraying intervals can be specifically adjusted to the respective application.

A second spraying nozzle 42 is arranged to generate a second spraying jet 44. The second spraying jet is used to clean the transport units of contaminants. The cleaning may be mechanical and/or chemical. Mechanical cleaning uses the mass and flow energy of the fluid to remove contaminants from the transport unit. Chemical cleaning uses material properties of the fluid to loosen adhesion of the contaminants. In this respect, the second liquid may also contain cleaning substances that are undesirable when wetted by the first spray device.

Cleaning using the second spraying jet takes place in a cleaning operating state. In the cleaning operating state, no transport of objects takes place. The cleaning operating state is initiated at regular intervals, for example after 8 hours. In particular, the feed in device 110 and the disposal device 120 are also at rest in the cleaning operating state.

In one embodiment, the spraying arrangement 40 includes a splash guard arrangement 45. The splash guard arrangement includes splash guards and is intended to prevent uncontrolled dispersal of fluid throughout the conveyor device and the environment, particularly during the cleaning mode.

In one embodiment, liquid can flow off into a collecting device 46 at a lower drain area 45A of the splash guard arrangement and then be cleaned by means of a treatment device 47 The treated liquid can then be made available again to the respective spraying nozzle by means of a recirculation 48. Separate treatment can be provided for each of the two spraying nozzles 41, 42.

Several first spraying nozzles may be provided, each of which is operated, for example, synchronously or together.

A plurality of second spraying nozzles may be provided, each of which is operated synchronously or asynchronously with one another.

Not shown but possible is the supply of fresh water to the spraying nozzles 41, 42 without treatment. Any waste water can be fed to the waste water disposal system.

LIST OF REFERENCE NUMERALS 100 conveyor arrangement
1 conveyor device
A1 takeover area
A2 transfer area
A3 handover area
A4 return area
F1 object unit
F2 conveyed object/object parts
11 Base carrier
12 support rail
21 transport unit (transport baskets)
21b bottom wall
21s side wall
21j taper
21f fixing section on transport unit
21a recesses
210 receiving opening
21k collar
40 spraying arrangement
41 first spraying nozzle
41p first spraying schedule
42 second spraying nozzle
43 first spraying jet
44 second spraying jet 45 splash guard arrangement
45A drain area
46 collecting device
47 preparation device
48 recirculation
410 spraying controller
411 input unit
412 presence sensor
110 feed in device
111 feed in conveyor
112 disposal unit (cutter)/separating device
120 disposal device
121 disposal conveyor
R conveying direction
V conveying speed
dt single spray interval
dT total spray interval
tU cycle duration
PI position information
U1 user input
C control command

The invention claimed is:

1. A conveyor device (1), adapted to
takeover of a conveyed object (F2) in a takeover area (A1) from an upstream feed in device (110),
transfer of the conveyed object (F2) in a handover area (A3),
handover the object (F2) in a handover area (A2) from the takeover area (A1) in the handover area (A3),
the conveyor device comprises
a plurality of discrete transport units (21) the transport units are adapted to
to receive the object (F2) to be conveyed in the takeover area (A1),
to be transferred between the takeover area (A1) and the handover area (A3),
and to handover the object (F2) to be conveyed in the handover area (A3),
wherein
the conveyor device comprises a spraying arrangement (40),
wherein the spraying arrangement (40) being adapted to provide at least one spraying functionality,
wherein the transport units are sprayed with a liquid via said spraying functionality,
wherein a first spraying functionality is provided for spraying the transport units (21) with a first liquid (43) in a transport operating state,
wherein a spraying controller (410) arranged to control the first spray function is included, wherein the spray controller (410) is arranged to control the first spray function in dependence on a stored spraying schedule (41P), and
wherein the spraying schedule comprises indications of the time sequence of discrete sprays.

2. A conveyor device (1), adapted to
takeover of a conveyed object (F2) in a takeover area (A1) from an upstream feed in device (110),
transfer of the conveyed object (F2) in a handover area (A3),
handover the object (F2) in a handover area (A2) from the takeover area (A1) in the handover area (A3),
the conveyor device comprises
a plurality of discrete transport units (21),
the transport units are adapted to
to receive the object (F2) to be conveyed in the takeover area (A1),
to be transferred between the takeover area (A1) and the handover area (A3),
and to handover the object (F2) to be conveyed in the handover area (A3),
wherein
the conveyor device comprises a spraying arrangement (40),
wherein the spraying arrangement (40) being adapted to provide at least one spraying functionality, wherein the transport units are sprayed with a liquid via said spraying functionality,
wherein a second spraying functionality is provided for spraying the transport units (21) with a second liquid (44) in a cleaning operating state.

3. Use of a conveyor device, adapted to
takeover of a conveyed object (F2) in a takeover area (A1) from an upstream feed in device (110),
transfer of the conveyed object (F2) in a handover area (A3),
handover the object (F2) in a handover area (A2) from the takeover area (A1) in the handover area (A3),
the conveyor device comprises
a plurality of discrete transport units (21), the transport units are adapted to
to receive the object (F2) to be conveyed in the takeover area (A1),
to be transferred between the takeover area (A1) and the handover area (A3),
and to handover the object (F2) to be conveyed in the handover area (A3),
wherein
the conveyor device comprises a spraying arrangement (40),
wherein the spraying arrangement (40) being adapted to provide at least one spraying functionality, wherein the transport units are sprayed with a liquid via said spraying functionality, and
wherein
during a cleaning operating state and
utilizing a second spraying functionality and the transport units (21) are sprayed with a second spraying liquid (43),
all transport units are free of objects to be conveyed.

4. A conveyor device (1), adapted to
takeover of a conveyed object (F2) in a takeover area (A1) from an upstream feed in device (110),
transfer of the conveyed object (F2) in a handover area (A3),
handover the object (F2) in a handover area (A2) from the takeover area (A1) in the handover area (A3),
the conveyor device comprises
a plurality of discrete transport units (21),
the transport units are adapted to
to receive the object (F2) to be conveyed in the takeover area (A1),
to be transferred between the takeover area (A1) and the handover area (A3),
and to handover the object (F2) to be conveyed in the handover area (A3),
wherein
the conveyor device comprises a spraying arrangement (40),
wherein the spraying arrangement (40) being adapted to provide at least one spraying functionality, wherein the transport units are sprayed with a liquid via said spraying functionality, wherein a first spraying functionality is provided for spraying the transport units (21) with a first liquid (43) in a transport operating state, wherein the first liquid (43) is arranged and/or intended to come into contact with the object (F2) to be conveyed, and wherein the conveyor device is adapted that the liquid is cleaned after contact with an object to be conveyed before it is subsequently brought into contact with another object to be conveyed, or that the first liquid is a fresh liquid intended for one-time contact with exactly one object to be conveyed.

5. A conveyor device (1), adapted to takeover of a conveyed object (F2) in a takeover area (A1) from an upstream feed in device (110), transfer of the conveyed object (F2) in a handover area (A3), handover the object (F2) in a handover area (A2) from the takeover area (A1) in the handover area (A3), the conveyor device comprises a plurality of discrete transport units (21), the transport units are adapted to to receive the object (F2) to be conveyed in the takeover area (A1), to be transferred between the takeover area (A1) and the handover area (A3), and to handover the object (F2) to be conveyed in the handover area (A3), wherein the conveyor device comprises a spraying arrangement (40), wherein the spraying arrangement (40) being adapted to provide at least one spraying functionality, wherein the transport units are sprayed with a liquid via said spraying functionality, wherein a first spraying functionality is provided for spraying the transport units (21) with a first liquid (43) in a transport operating state, and wherein, within the scope of the first spray functionality, discrete spray bursts are delivered in individual spray intervals (dt).

6. A conveyor device (1), adapted to takeover of a conveyed object (F2) in a takeover area (A1) from an upstream feed in device (110), transfer of the conveyed object (F2) in a handover area (A3), handover the object (F2) in a handover area (A2) from the takeover area (A1) in the handover area (A3), the conveyor device comprises a plurality of discrete transport units (21), the transport units are adapted to receive the object (F2) to be conveyed in the takeover area (A1), to be transferred between the takeover area (A1) and the handover area (A3), and to handover the object (F2) to be conveyed in the handover area (A3), wherein the conveyor device comprises a spraying arrangement (40), wherein the spraying arrangement (40) being adapted to provide at least one spraying functionality, wherein the transport units are sprayed with a liquid via said spraying functionality, wherein a first spraying functionality is provided for spraying the transport units (21) with a first liquid (43) in a transport operating state, and wherein, within a framework of the first spray functionality, the transport units (21) are each sprayed once, with a spray burst within a predetermined total spray interval (dT), the spray bursts being delivered at intervals of an individual spray interval (dt), the product of the number of transport units and the length of the individual spray intervals (dt) being larger than a circulation duration (tU) of the conveyor device (1).

7. A conveyor device (1), adapted to takeover of a conveyed object (F2) in a takeover area (A1) from an upstream feed in device (110), transfer of the conveyed object (F2) in a handover area (A3), handover the object (F2) in a handover area (A2) from the takeover area (A1) in the handover area (A3), the conveyor device comprises a plurality of discrete transport units (21), the transport units are adapted to to receive the object (F2) to be conveyed in the takeover area (A1), to be transferred between the takeover area (A1) and the handover area (A3), and to handover the object (F2) to be conveyed in the handover area (A3), wherein the conveyor device comprises a spraying arrangement (40), wherein the spraying arrangement (40) being adapted to provide at least one spraying functionality, wherein the transport units are sprayed with a liquid via said spraying functionality wherein a second spraying functionality is provided for spraying the transport units (21) with a second liquid (44) in a cleaning operating state, wherein the second liquid (44) comprises at least one chemical cleaning agent.

8. A conveyor arrangement (100) comprising a feed in device (110) for providing conveyed objects (F2) at a takeover section (A1), a conveyor device (1) for transferring the object (F2) provided at the takeover section (A1) from the feed in device (110) to a handover area (A3) and to a disposal device (120), said conveyor device (1) adapted to takeover of a conveyed object (F2) in a takeover area (A1) from an upstream feed in device (110), transfer of the conveyed object (F2) in a handover area (A3), handover the object (F2) in a handover area (A2) from the takeover area (A1) in the handover area (A3), the conveyor device comprises a plurality of discrete transport units (21), the transport units are adapted to to receive the object (F2) to be conveyed in the takeover area (A1), to be transferred between the takeover area (A1) and the handover area (A3), and to handover the object (F2) to be conveyed in the handover area (A3), wherein the conveyor device comprises a spraying arrangement (40), wherein the spraying arrangement (40) being adapted to provide at least one spraying functionality, and wherein the transport units are sprayed with a liquid via said spraying functionality, wherein a cutting device is arranged at the transfer section (A3).

* * * * *